United States Patent [19]
Sieghartner

[11] Patent Number: 5,934,683
[45] Date of Patent: Aug. 10, 1999

[54] ROTARY SEAL ASSEMBLY HAVING GROOVED SEAL FACING

[75] Inventor: Leonard J. Sieghartner, Coal Valley, Ill.

[73] Assignee: Roy E. Roth Company, Rock Island, Ill.

[21] Appl. No.: 08/890,836

[22] Filed: Jul. 10, 1997

[51] Int. Cl.$^6$ .................................................. F16J 15/34
[52] U.S. Cl. .......................................... 277/400; 277/405
[58] Field of Search .................................. 277/361, 400, 277/404, 405

[56] References Cited

U.S. PATENT DOCUMENTS

| | | | |
|---|---|---|---|
| 4,212,475 | 7/1980 | Sedy | 277/400 |
| 4,261,581 | 4/1981 | Hershey | 277/370 |
| 4,405,134 | 9/1983 | Sargent et al. | 277/422 |
| 4,573,691 | 3/1986 | Wilkinson | 277/392 X |
| 4,733,873 | 3/1988 | Takenaka et al. | 277/400 |
| 4,884,945 | 12/1989 | Boutin et al. | 277/400 X |
| 4,889,348 | 12/1989 | Amundson et al. | 277/400 X |
| 4,890,851 | 1/1990 | Avard et al. | 277/392 |
| 4,932,848 | 6/1990 | Christensen | 417/414 |
| 4,972,986 | 11/1990 | Lipschitz | 277/361 |
| 5,071,141 | 12/1991 | Lai et al. | 277/400 |
| 5,090,712 | 2/1992 | Pecht et al. | 277/400 |
| 5,172,918 | 12/1992 | Pecht et al. | 277/400 |
| 5,174,614 | 12/1992 | Kaleniecki | 285/279 |
| 5,180,173 | 1/1993 | Kimura et al. | 277/400 |
| 5,201,531 | 4/1993 | Lai | 277/400 |
| 5,217,233 | 6/1993 | Pecht et al. | 277/400 X |
| 5,222,743 | 6/1993 | Goldswain et al. | 277/400 |
| 5,224,714 | 7/1993 | Kimura et al. | 277/400 |
| 5,312,117 | 5/1994 | Takenaka et al. | 277/400 |
| 5,375,855 | 12/1994 | Goldswain et al. | 277/400 |
| 5,388,843 | 2/1995 | Sedy | 277/400 X |
| 5,398,943 | 3/1995 | Shimuza et al. | 277/400 |
| 5,441,293 | 8/1995 | Sturgess | 280/432 |
| 5,447,316 | 9/1995 | Matsui | 277/400 |
| 5,454,572 | 10/1995 | Pospisil | 277/400 X |
| 5,702,110 | 12/1997 | Sedy | 277/400 |

Primary Examiner—Lynne A. Reichard
Assistant Examiner—Greg Binda
Attorney, Agent, or Firm—Emrich & Dithmar

[57] ABSTRACT

A seal assembly for sealing a volatile liquid from escaping past a rotating shaft mounted within a housing, includes a rotating sealing ring having a seal facing keyed to the shaft and a stationary sealing ring having a seal facing mounted to the housing. The seal facing of the stationary sealing ring is in contact with the sealing facing of the sealing ring keyed to the shaft when the shaft is non-rotating. When the sealing ring is rotated by the shaft the seal faces are disengaged from one another. One of the seal facings of either the rotating or stationary sealing ring includes a plurality of notches positioned on the outer radial edge of the sealing surface at an angle of approximately 45° with respect to the perpendicular peripheral surface of the sealing ring.

20 Claims, 3 Drawing Sheets

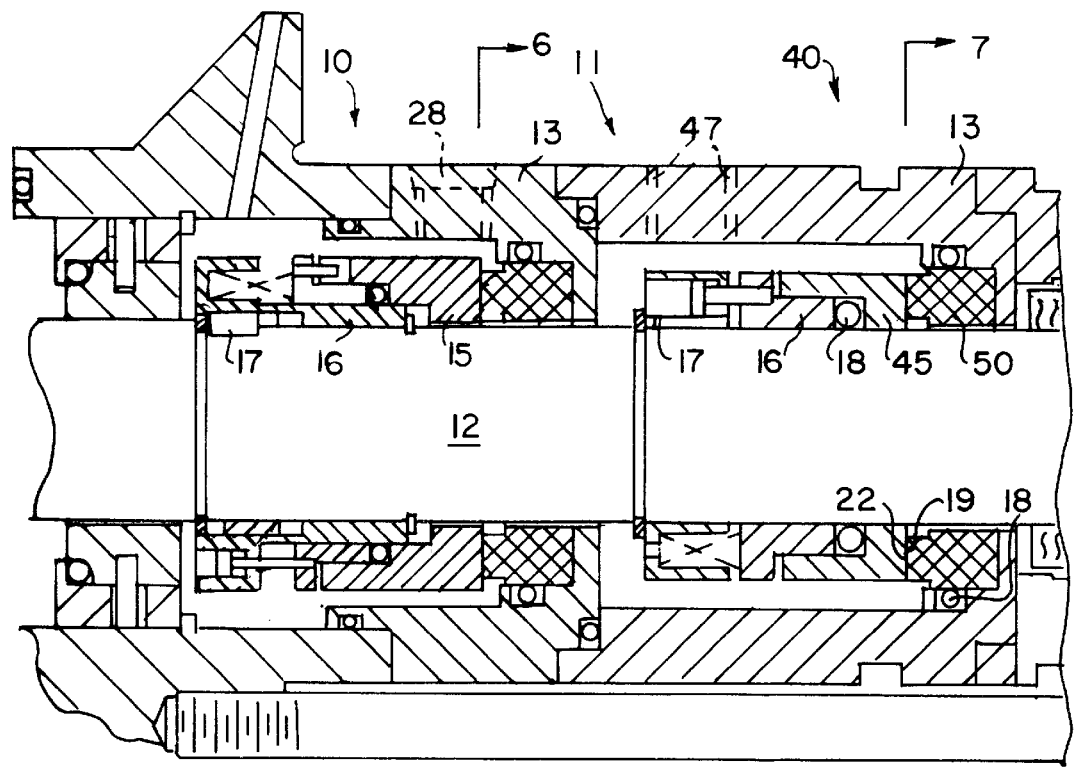
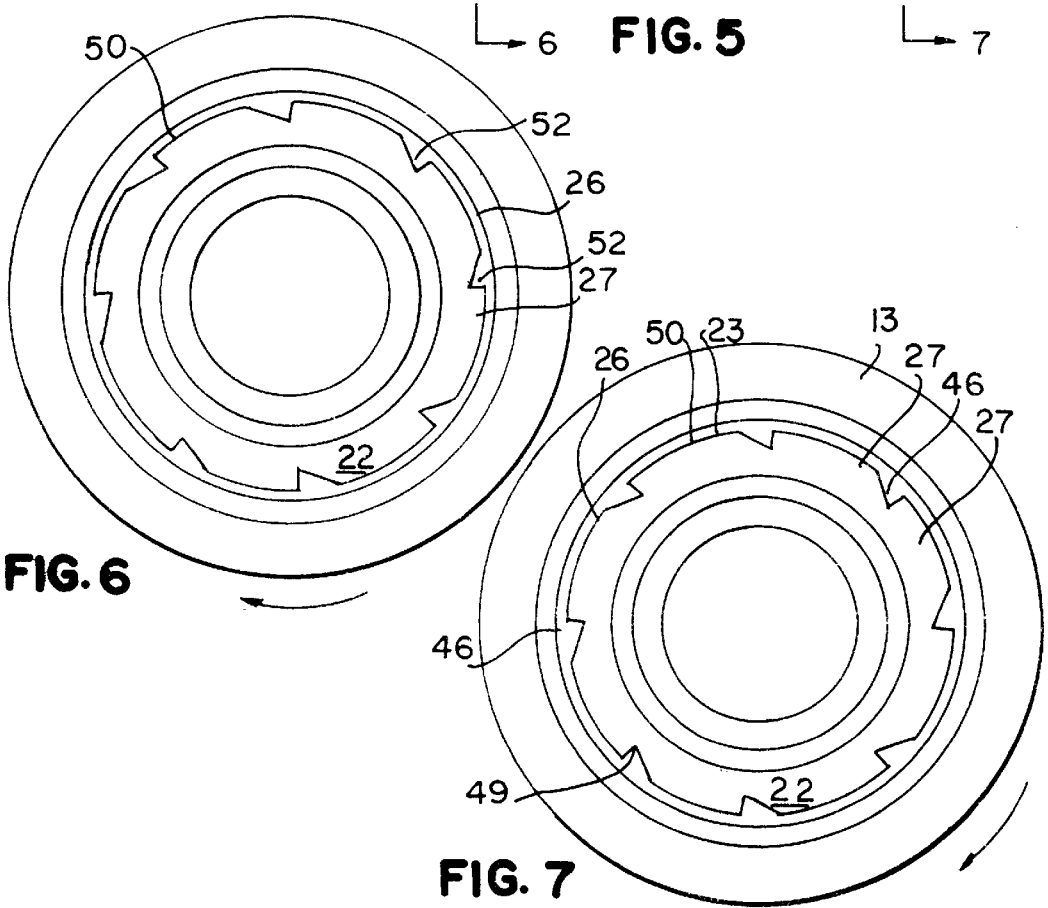

ROTARY SEAL ASSEMBLY HAVING GROOVED SEAL FACING

BACKGROUND OF THE INVENTION

The present invention relates to a novel seal facing for use with a mechanical rotary seal to prevent dry running during the pumping of volatile liquids.

A number of structural modifications to seal facings have been suggested for preventing the dry running condition encountered in gas seals. For example, Sedy U.S. Pat. No. 4,212,475 and Pecht et al. U.S. Pat. No. 5,217,233 are examples of grooved structures in modified seal facings which allegedly prevent the dry running condition in gas seals.

These modified seal facings in gas seals have been applied to fluid pumps. However, in such instances, the seal facing of one of the mechanical seals includes spiral shaped grooves or channels which are so positioned that when the mechanical seal is rotated, fluid is pumped into the edge of one of the sealing rings to form a barrier therebetween to prevent contact between the mechanical face seals under such dynamic conditions. Accordingly, such seal facings have notched faces with bottoms of the grooves parallel to the face. See, for example, Amundson et al. U.S. Pat. No. 4,889,348 and Kimura et al. U.S. Pat. No. 5,180,173. Also, Sedy U.S. Pat. No. 5,531,458 discloses progressively narrower grooves to somehow provide a pressure buildup. However, because the mating face seal surfaces must be lapped to provide planar surfaces during dynamic operation to prevent leakage of liquified gases, these flat facing surfaces tend to ring together. This is particularly manifested in the pumping of volatile liquids, such as ammonia, which results in the build-up of heat and the destruction of the face seal. Thus, the prior art suggested modifications to the mating surfaces have not prevented a dry running condition when utilized to pump volatile liquids.

The Environmental Protection Agency has issued stringent standards for pumps which are used to pump certain hazardous fluids. For example, the standards for light liquid service require dual mechanical seal systems and a barrier fluid system with each dual mechanical seal system. Also, the barrier fluid system must be operated with the barrier fluid at a pressure that is at all times greater than the pump stuffing box pressure or equipped with a barrier fluid degassing reservoir that is connected by a closed-vent system to a control device. An alternative requirement is that the pump be designed with no externally actuated shaft penetrating the impeller casing.

SUMMARY OF THE INVENTION

One object of the present invention is to predeterminedly locate tapered notches on the radial edge of one of the facing surfaces of a rotary seal assembly to prevent dry running under dynamic operating conditions.

It is a further object of the present invention to utilize tapered notches predetermindely located about the peripheral edge of one of the mating seal surfaces such that upon rotation of the companion mating seal surface, the pumped liquid is forced into the tapered notches and is wedged onto the lapped surface to prevent dry running during dynamic operating conditions.

It is still another object of the present invention is to provide a novel mechanical face seal assembly having tapered notches spaced about the peripheral edge of at least one of the seal facings, which structure provides directional orientation and a wedging action under dynamic operating conditions to prevent leakage through and between the sealing ring faces.

Another object of the present invention is a novel mechanical face seal which may be used in both primary and secondary seals in double or tandem seals with no external pressure required.

Still another object of the present invention is to provide a continuous unbroken planar area between the sealing ring surfaces radially inwardly of the tapered notch portion to prevent leakage through and between the sealing ring faces and to prevent dry running during dynamic operating conditions.

It is still a further object of the present invention to provide planar sealing facing areas between the tapered notches cut on the peripheral edge of one of the planar facing surfaces which structure provides a lubricated pressure distribution area to support the hydraulic closing pressures between the mechanical seal assembly during dynamic operating conditions.

A further object of the present invention is to provide a pump assembly which is characterized by improved protection against leakage as compared to existing pump assemblies and which meets Environmental Protection Agency standards.

It is yet another object of the present invention to provide notched faces having sloping bottoms to enhance pressure buildup and which may be accomplished by a single stroke when machining the notched facing.

The present invention relates to structural modifications made to the seal facing of at least one facing member or ring of a mechanical rotary seal. The mating planar surfaces of each of the facings of the sealing rings is lapped within 1 to 2 light bands flatness to prevent leakage of the liquid at or near its boiling point therethrough. The mating face planar surfaces are normally carbon graphite for one of the sealing rings, with the other sealing ring being composed of either tungsten carbide, silicon carbide, or other similar hard material. However, both facings may be of a hard material of different grades rather than one of carbon graphite.

The problem of wringing together, which results in a squeak or chirp during dynamic operating conditions, and the resultant heat build-up during such dry running conditions results in rapid destruction of the seal facings of a rotary seal assembly. To overcome this problem with planar mating seal facings in accordance with the present invention, tapered notches or grooves are positioned in the outer peripheral edge portion of one of the seal ring facing surfaces, which tapered structure permits the inducement a liquid film at least part way across the seal facings. The tapered notches are generally made in the carbon graphite seal facing because of the ease in making the tapered notches therein. The tapered notches are radially induced in the seal facing from the outer peripheral edge and extending inwardly therefrom with approximately ½ to ¾ inches of the flat seal facing surface or land between each of the tapered notches. The tapered notches induce a fluid film between the seal surface facings and provide the primary seal for the pumped fluid at or near the pumped fluid's boiling point. The tapered notches generally extend about ⅛ of an inch radially inwardly into the seal facing at an angle of about 45 degrees with respect to the outer peripheral edge surface of the seal ring. The shape of the groove lends itself to be shaped by a disc shaped grinding wheel, thus permitting the facing to be made from a near diamond hard material such as silicon carbide. The tapered notch has a depth of approximately 1/32nd an inch at the outer peripheral edge and extends rearwardly approximately 1/8 inch at a slope of between about 5 to 15 degrees. The width of the tapered notch is approximately 1/16th inch. It is generally preferred that the stationary seal facing have the tapered notches therein.

The inclined surface of the tapered notch forces liquid between the rotating seal ring facing and the notched stationary seal ring facing to induce a fluid film between the facings. The pumped liquid is forced into the tapered notches and is wedged by the sloping bottom onto the lapped surface facing or lands of the seal facing. The angle at which the tapered notch extends into the seal facing provides directional orientation, wedging action, and lubricated pressure distribution areas to support the hydraulic closing pressures of the seal assembly. It has been found that the planar surface or land between the tapered notches should not be greater than 1/2 to 3/4th of an inch therebetween.

The present invention consists of certain novel features and structural details hereinafter fully described and illustrated in the accompanying drawings, and particularly pointed out in the appended claims, it being understood that various changes in the details may be made without departing from the spirit, or sacrificing any advantages of the present invention.

DESCRIPTION OF THE DRAWINGS

For the purposes of facilitating and understanding the invention, there is illustrated in the accompanying drawings a preferred embodiment thereof, from an inspection of which, when considered in connection with the following description, the invention, its construction and operation, and many of its advantage will be readily understood and appreciated.

FIG. 5 is a cross-sectional view of a mechanical rotary seal in accordance with another embodiment of the present invention;

FIG. 6 is a section of the mechanical rotary seal taken along lines 6—6 in FIG. 5;

FIG. 7 is a section of the mechanical rotary seal taken along lines 7—7 in FIG. 5;

DESCRIPTION OF THE PREFERRED EMBODIMENT

Figure 1:
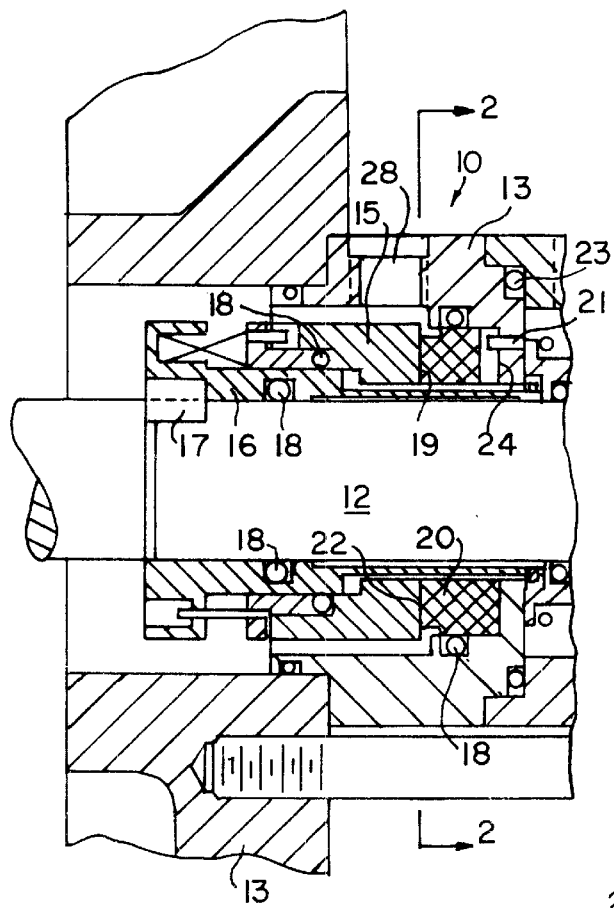
FIG. 1 is a cross-sectional view of a mechanical rotary seal in accordance with one embodiment of the present invention.

Referring now to the drawings wherein like numerals have been used throughout several views to illustrate the same or similar parts, in FIG. 1 a rotary seal assembly 10 is illustrated. In accordance with one embodiment of the present invention, the rotary seal assembly 10 is incorporated into a pump assembly which is designed to pump volatile liquids, such as liquid ammonia. Although the invention is at times described with reference to liquid ammonia as the fluid, it is to be understood that other liquids under appropriate pressures and temperatures can be handled with the appropriate changes and adjustments to the system to conform the essential parameters to the field being sealed wherein the pumped fluid is required to be pumped at or near its boiling point.

As illustrated in FIG. 1, the primary rotary seal assembly 10 provides a liquid type seal between a shaft 12 and a housing 13 and includes a first sealing member or ring 15 which is mounted to a sleeve member 16 keyed to the shaft 12, as is known in the art. Thus, the first sealing member or ring 15 is keyed to the shaft 12 to rotate therewith in a known manner. Appropriately, O-rings 18 are provided between the sleeve 16 and the shaft 12 and between the sleeve 16 and the first sealing ring 15 to provide a seal therebetween. The sleeve 16 is keyed, at 17, to the shaft 12 for rotation therewith and for preventing the axial movement of the first sealing ring 15 with respect to the housing 13. The first sealing ring 15 is adapted for rotation with the shaft and may be considered to provide the rotary ring portion of the seal assembly 10.

A second sealing member or ring 20 is locked to the housing 13 to provide the stationary sealing ring portion of the primary rotary seal assembly 10. The second sealing member or ring 20 is held from rotation by pin 21 mounted to the housing 13, which pin cooperates with a recess (not shown) in the back surface 24 of the second sealing ring 21 to prevent rotation of the second ring 21 with respect to the housing 13. Each of the first sealing member or ring 15 and the second sealing member or ring 20 have lapped facing surfaces 19 and 22, respectively, which are lapped within 1 to 2 light bands flatness to prevent leakage of the liquid at or near the liquid boiling point. The second sealing member or ring 20 is generally comprised of carbon graphite, with the first sealing member or ring 15 preferably being composed of either tungsten carbide, silicon carbide, or other similar hard material. As shown in FIG. 1, appropriate sealing O-rings 18 are provided to provide a seal between the second sealing member or ring 20 and the housing 13. Under dynamic operating conditions, the lapped surface 19 of the first sealing member or ring 15 is maintained at a gap distance of approximately the diameter of the pumped volatile liquid or gas molecule from the stationary lapped surface 22 of the second sealing member or ring 20. The pumped liquid is utilized as a seal flush and is introduced through conduit 28 to provide the seal flush for the primary rotary seal assembly 10.

Figure 3:
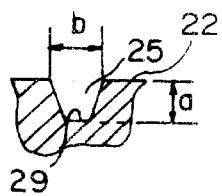
FIG. 3 is a sectional view of the tapered notched opening in the mechanical rotary seal in accordance with one embodiment of the present invention.
Figure 2:
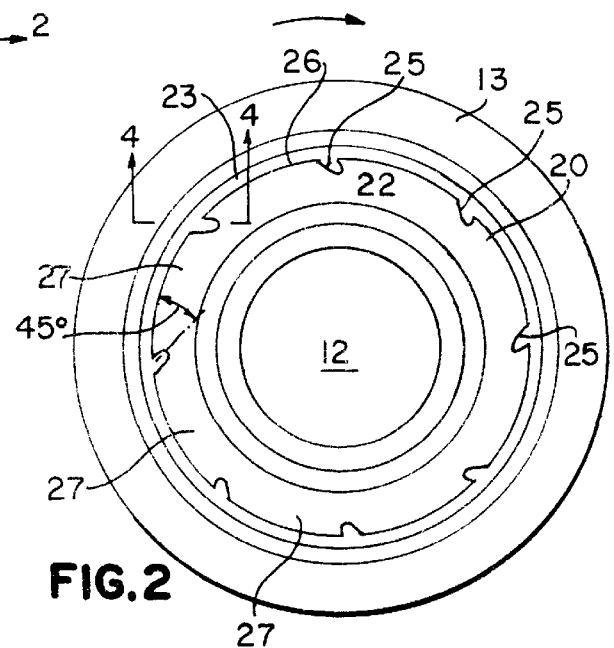
FIG. 2 is a section of the mechanical rotary seal taken along line 2—2 in FIG. 1.

The operation of the rotary seal assembly 10 under dynamic operating conditions requires that the seal between the rotating lapped surface 19 and the stationary lapped surface 22 be properly lubricated and cooled to prevent the dry running condition which results in the seal assembly being destroyed during operation. Accordingly, in accordance with one embodiment of the present invention, the lapped surface 22 of the second sealing ring or member 20 includes a plurality of tapered notches 25 positioned along the outer peripheral front edge portion 23 of the lapped surface 22. The tapered notches 25 are radially positioned about the outer peripheral front edge portion 23 of the lapped facing surface 22, with approximately ½ to ¾th inches of flat seal facing or land surface 27 between each of the tapered notches. As shown in FIG. 2, the tapered notches 25 are equally spaced about the outer radial peripheral edge portion 23 of the lapped surface or seal facing 22. As also shown in FIG. 2, the tapered notches 25 are positioned with respect to a tangent of the outer radial edge 26 of the second sealing member or ring 20 at an angle of approximately 45 degrees thereto. The tapered notches 25 generally extend about ⅛th of an inch radially inwardly into the seal facing at the angle of about 45 degrees with respect to the peripheral radial edge surface of the seal facing. The tapered notch has a depth of approximately 1/32th of an inch at the outside periphery, as designated "a" in FIG. 3, with the width of the tapered notch being approximately 1/16th of an inch, as designated "b" in FIG. 3.

The inclined surface 30 (FIG. 4) of the tapered notch 25 forces liquid between the rotating lapped facing surface 19 of the first sealing ring or member 15, and the stationary lapped facing surface 22 of the second sealing ring 20. As shown in FIG. 2, when the first sealing ring 15 is rotated in a clockwise direction, such motion forces the pumped liquid into the tapered notches 25 wherein it is wedged by the sloping bottom 29 thereof onto the lapped facing surfaces 19 and 22 of the sealing ring members 15 and 20, respectively. As the liquid is forced into the tapered notches 25, the liquid is wedged by the sloping bottom 29 onto the land surfaces 27 between the sealing rings in a directional orientation to provide a wedging action which distributes the lubricated pumped liquid onto the seal lapped surfaces to support the hydraulic closing pressures of the seal assembly. This maintains the rotary seal assembly in a dynamic operating condition wherein each of the seal facings are maintained at a gap distance of approximately the diameter of the pumped volatile liquid or gas provided that the planar surface or land 27 between the tapered notches 25 is no greater than about ½ to ¾ of an inch therebetween.

Figure 4:
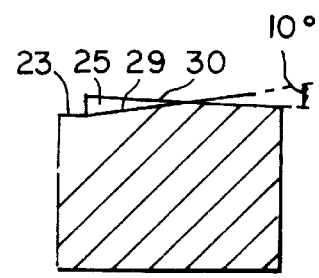
FIG. 4 is an side view of the peripheral edge of the notched groove in the seal ring in accordance with one embodiment of the present invention.

As shown in FIG. 4, a cross-sectional view of the tapered notch 25 illustrates that the degree of slope of the ⅛th inch length of the tapered notch is approximately 10 degrees. However, it is within the scope of the present invention that the tapered notch may be sloped between about 5 to 15 degrees.

In accordance with a further embodiment of the present invention, the primary rotary seal assembly 10 is incorporated into a pump assembly 11 designed to pump a liquid or gas, such as liquid ammonia with the pump assembly 11 including a secondary rotary seal assembly 40 incorporated in tandem with the primary rotary seal assembly 10. The secondary seal assembly 40 provides a dual mechanical seal and barrier system for the pump assembly. As illustrated in FIG. 5 and described above, the primary rotary seal assembly 10 provides a liquid or gas type seal between the shaft 12 and the housing 13 and includes a first sealing member or ring 15 which is mounted to a sleeve member 16 keyed to the shaft 12, as has been previously described. To the same extent, the secondary rotary seal assembly 40 provides a liquid or gas type seal between the shaft 12 and housing 13 and includes a first sealing member or ring 45 mounted on the sleeve member 16 keyed at 17 to the shaft. Appropriately, o-rings 18 are provided between the sleeve 16 and the shaft 12 and between the sleeve 16 and the first sealing ring 45 to provide a seal therebetween. As previously described, sleeve 16 is keyed to the shaft 12 for rotation and for preventing the axial movement of the first sealing ring 45 with respect to the housing 13. The first sealing ring 45 is adapted for rotation with the shaft and may be considered to provide a rotary sealing ring portion of the secondary seal assembly 40. A second sealing member or ring 50 is locked to the housing 13 to provide the stationary sealing ring portion of the secondary rotary seal assembly 40.

The first rotating sealing member or ring 45 and the second stationary sealing member or ring 50 each have lapped facing surfaces 19 and 22, respectively, which are lapped within 1 to 2 light bands flatness to prevent leakage of the liquid or gas at or near their boiling point. As previously described, the second sealing member or ring 50 is generally comprised of carbon graphite, with the first sealing member or ring 45, being composed of either tungsten carbide, silicon carbide, or other similar hard material.

As shown in FIG. 5, sealing O-rings 18 are provided in the assembly to provide a seal between the second sealing member or ring 50 and the housing 13. Under the at rest condition, the lapped surfaces 19 of the primary and secondary sealing assemblies abut and engage the stationary lapped surface 22 of the primary and secondary seal assemblies. The pumped liquid is utilized as a seal flush and is introduced through conduit 28 to provide the seal flush for the primary rotary seal assembly 10.

Figure 8:
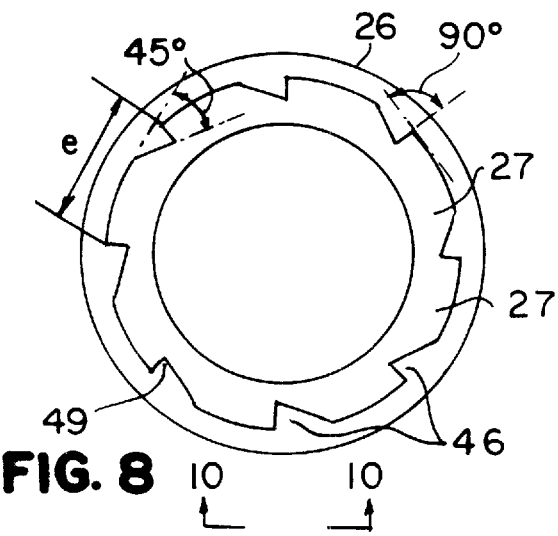
FIG. 8 is a top view of the mechanical rotary seal in accordance with one embodiment of the present invention.
Figure 11:
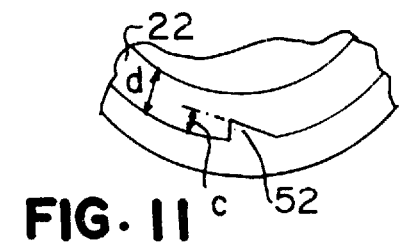
FIG. 11 is an enlarged top plane view of one embodiment of the mechanical rotary seal in accordance with the present invention.
Figure 9:
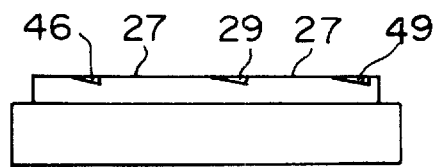
FIG. 9 is a side view of the mechanical rotary seal of FIG. 8.

When the rotary seal assemblies 10 or 40 are operated under dynamic operating conditions, the seal between the rotating lapped surface 19 and the stationary lapped surface 22 must be properly lubricated and cooled to prevent the dry running condition, which results in the seal assembly being destroyed during operation. Thus, in accordance with the embodiment of the present invention illustrated in FIGS. 5–11, the lapped surface 22 of the stationary second sealing ring or member 50 may include a plurality of partial D-shaped tapered notches 46 (FIGS. 7, 8 and 10A) positioned along the outer radial front edge portion 23 of the lapped surface 22 or may include generally triangular shaped tapered notches 52 (FIGS. 6 and 11). The partial D-shaped tapered notches 46 or generally triangular shaped tapered notches 52 are predeterminedly spaced about the outer radial front or peripheral edge portion 23 of the lapped facing surface 22 with approximately ½ to ¾th inches of flat seal facing or land surface 27 between each of the tapered notches 46 or 52. However, it is preferred that the land space between notches should be about 6 to 8 times the width of the notch or groove. As shown in FIGS. 6–9, the partial D-shaped tapered notches 46 are equally spaced about the outer peripheral edge portion 23 of the lapped surface 22. As also shown in FIG. 8, the partial D-shaped tapered notches 46 are positioned with respect to a tangent of the outer radial edge 26 of the second sealing member or ring 20 at an angle of approximately 45 degrees, with the base of the D-shaped notches 46 being at about perpendicular thereto. The partial D-shaped tapered notches 46 generally extend about ⅛th of an inch "c" radially inwardly across the seal facing at an angle of about 45 degrees with respect to the arcuate radial edge surface 26 of the seal facing. The notch extension across the surface is approximately ½ the diameter of the seal facing or less. The tapered notch 46 has a depth 49 of approximately 1/32th of an inch at the outside periphery, as shown in FIGS. 7 and 8, with the width of the tapered notch being approximately 1/16th of an inch, as designated "c" in FIG. 8.

The inclined surface 30 of the tapered notch 46 forces liquid between the rotating lapped surface 19 of the second sealing ring member 45, and the stationary lapped facing surface 22 of the second fixed sealing ring 50. As shown in FIGS. 5, 6 and 7, the second sealing ring 45 is rotated in a clockwise position which motion forces the pumped liquid into the partial D-shaped tapered notches 46 (FIG. 7) or generally triangular shaped notches 52 (FIG. 6) wherein it is wedged by the sloping bottom 29 thereof onto the lapped facing surfaces 19 and 22 of the sealing ring members 45 and 50, respectively. As the liquid is forced into the tapered notches 46 or 52, the liquid is wedged by the sloping bottom 29 onto the lapped surfaces between the sealing rings in a directional orientation to provide a wedging action which distributes the lubricated pumped liquid onto the seal or land surfaces 27 to support the hydraulic closing pressures of the seal assembly. This maintains the rotary seal assembly in a dynamic operating condition provided that the planar surface or land 27 between the tapered notches 25 is no greater than about ½ to ¾ of an inch, as shown by "e" in FIG. 8. The seal facings are spaced apart from each other at approximately one molecule thickness of the pumped fluid. Alternatively, although not shown in FIG. 7, the lapped facing surface are, preferably, planar because the notches are not critical because the secondary seal is in an environment of the buffer fluid not the pumped volatile liquid, as will hereinafter be described.

Figure 10:
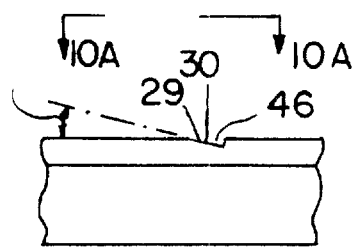
FIG. 10 is a section of one embodiment of the mechanical rotary seal taken along lines 10—10 in FIG. 8.
Figure 10A:
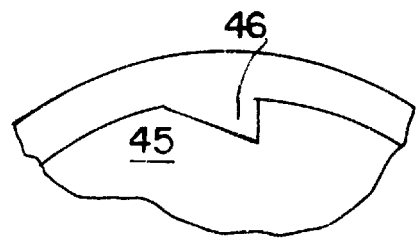
FIG. 10A is an enlarged frontal view of the mechanical rotary seal as shown in FIG. 10.

As described with respect to FIG. 10, a cross-sectional view of the partial D-shaped tapered notches 46 illustrates that the degree of slope 32 of the tapered notches is approximately 10 degrees. However, it is within the scope of the present invention that the tapered notch 46 may have a slope of between about 5° to 15°.

Figure 12:
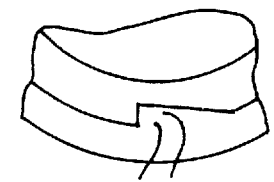
FIG. 12 is an enlarged top plane view of another embodiment of the mechanical rotary seal in accordance with the present invention.

In accordance with the present invention, FIG. 12 illustrates a further embodiment of the tapered notches 52 which includes a notch having tapered sloping bottom 29 which extends inwardly across the lapped facing surface 22 from the outer peripheral radial edge portion 26. In this embodiment, the notch in the seal facings between the rotating and the fixed sealing ring provides directional orientation and a wedging action under dynamic operating conditions to prevent leakage through and between the sealing ring faces. This is true also for the embodiments of the present invention as shown in FIGS. 1–4 and 5–11. As shown in FIGS. 5 and 6, the relative motion between the second sealing member or ring 45 and the fixed sealing ring 50 serves to force the pumped volatile liquid into the notches 52. This action lubricates the faces and prevents the dry running condition of the assembly. Also as shown in FIG. 5, the buffer fluid for the pumped volatile liquid is circulated through the unit through ports 47 to carry away excess heat from the rotary seal assembly. The secondary rotary seal assembly 40 retains these fluids and acts as a backup or secondary seal assembly for the unit. As shown in FIG. 5, the primary rotary seal assembly 10, composed of a first sealing ring 15 and a second fixed sealing ring 20, is balanced to withstand the entire primary pressure of the unit. The flush liquid is introduced through conduit or port 28 to the primary rotary seal assembly 10 and the buffer fluid is introduced to the secondary rotary seal assembly through ports 47. However, it is important to note that although the secondary rotary seal assembly 40 is shown in FIG. 7 to include notches 46 on lapped facing surface 22 of the second fixed sealing ring 50, the lapped facing surface 22, preferably, should be void of notches because the secondary rotary seal assembly 40 is in an environment of the buffer fluid not the pumped volatile liquid. In such a structure the notched lapped facing surface is not critical to the operation of the secondary rotary seal assembly 40.

In accordance with the present invention, the planer seal facing surfaces between the tapered notches on the seal facings provides a lubricated pressure distribution area which supports the hydraulic closing pressures between the mechanical seal assembly 10 during dynamic operating conditions. Such a structure overcomes the problem of ringing together or dry running which results in a squeak or chirp during dynamic operating conditions and which is evidence of heat build-up which will result in the rapid destruction of the seal facings of the rotary seal assembly.

It is contemplated and within the scope of the present invention that the primary rotary seal assembly 10 will be comprised of a first sealing ring and a second fixed sealing ring which will provide unique and novel pressure distribution area which is supported by hydraulic closing pressures between mechanical rotary seal assembly. Additionally, it is within the scope of the present invention that the primary rotary seal assembly, as shown in FIG. 1, may be used individually or in tandem with a secondary seal assembly, as shown in FIG. 5. In such an instance, the secondary rotary seal assembly may be identical in operation to the primary rotary seal assembly or could be another type of mechanical seal assembly which would provide the dual mechanical seal systems and barrier fluid system in accordance with the present invention. Such alternative sealing structures would include packing and gland type seals.

Also, it is within the present invention that the notches may be incorporated in the rotating sealing ring or member to provide the pressure distribution area which supports the hydraulic closing pressures during dynamic operating conditions.

Additionally, it is within the scope of the present invention that the novel tapered notches that are contemplated for use in the present invention may be as described and shown in FIGS. 1–4, or may be shown as the partial D-shaped configuration, as shown in FIGS. 7–10A, or may be a generally triangular shaped tapered notch, as shown in FIGS. 6, 11 and 12. Importantly, notches are placed on the peripheral edge of the fixed sealing ring 20 which is generally comprised of a carbide graphite. The facing is ground and lapped after the sintering process. The hard silicon carbide facing of the first sealing ring 15 rotates against the carbide second fixed sealing ring to provide the unique and novel benefits of the present invention. Thus, it is preferred that the tapered notches are first placed in the facing of the carbon graphite fixed sealing ring and then the first sealing ring is rotated, as shown by the arrows in FIGS. 2 and 6. In such a dynamic condition, liquid is forced into the notches and is wedged by the sloping bottom onto the lapped surfaces of the seal facing.

I claim:

1. A primary seal assembly for sealing a volatile liquid from escaping past a rotating shaft mounted within a housing, including in combination:

a rotating sealing ring keyed to said shaft and having a radially extending seal facing;

a stationary sealing ring mounted to said housing and having a radially extending seal facing, with said seal facing of said rotating sealing ring being in contact with said seal facing of said stationary sealing ring when the shaft is non-rotating and with said seal facing of said rotating sealing ring being disengaged from seal facing of said stationary sealing ring when said shaft is rotated;

wherein one of said seal facings of either of said rotating or said stationary sealing ring is comprised of a plurality of sloped notches perdeterminedly spaced about and positioned on the radially extending portion of said seal facing of said respective sealing ring at an angle of approximately 45 degrees with respect to the perpendicular tangent of the peripheral surface of said respective sealing ring; and wherein the space between said sloped notches is a land space which provides a lubricated pressure distribution area for the volatile liquid to prevent a dry running condition.

2. The primary seal assembly according to claim 1, wherein said notches are formed on said radial extending seal facing of said stationary sealing ring.

3. The primary seal assembly in accordance with 1, wherein said notches are formed on said radial extending seal facing of said rotating sealing ring.

4. The primary seal assembly in accordance with claim 1, wherein said notches extend from the outside peripheral edge surface of said respective seal facing approximately to the midpoint of said respective seal facing.

5. The primary seal assembly in accordance with claim 1, wherein said land space between each of the said notches on said radially extending seal facing is between about ½ to ¾ of an inch.

6. The primary seal assembly in accordance with claim 1, wherein said notches are tapered from the outside radial edge inwardly at an angle of about 5° to 15°.

7. The primary seal assembly in accordance with claim 6, wherein said angle of slope is approximately 10°.

8. The primary seal assembly in accordance with claim 1, wherein said sloped notches include a partial D-shaped configuration.

9. The primary seal assembly in accordance with claim 1, wherein said sloped notches include tapered side and bottom walls.

10. The primary seal assembly in accordance with claim 1, wherein said stationary seal ring includes a material selecting from a group consisting of carbon graphite, tungsten carbide and silicon carbide.

11. The primary seal assembly in accordance with claim 1, wherein said rotating sealing ring includes a material selected from a group consisting of carbon graphite, tungsten carbide and silicon carbide.

12. The primary seal assembly in accordance with claim 1, wherein said sloped notches include a triangular shaped configuration.

13. A tandem seal assembly for sealing a volatile liquid from escaping past a rotating shaft mounted within a housing, including in combination:

a primary seal assembly including a rotating sealing ring keyed to said shaft and having a radially extending seal facing, a stationary sealing ring mounted to said housing and having a radially extending seal facing, with said seal facing of said rotating sealing ring being in contact with said seal facing of said stationary sealing ring when the shaft is non-rotating and with said seal facing of said rotating sealing ring being disengaged from seal facing of said stationary sealing ring when said shaft is rotated, and wherein one of said seal facings of either of said rotating or said stationary sealing ring is comprised of a plurality of sloped notches predeterminedly spaced about and positioned on the radially extending seal facing of said respective sealing ring at an angle of approximately 45 degrees with respect to the perpendicular tangent of the peripheral surface of said respective sealing ring and wherein the space between notches is a land space which provides a lubricated pressure distribution area for the volatile liquid to prevent a dry running condition; and a secondary seal assembly including a rotating sealing ring keyed to said shaft and having a radially extending seal facing, a stationary sealing ring mounted to said housing and having a radially extending seal facing, with said seal facing of said rotating sealing ring being in contact with said seal facing of said stationary sealing ring when the shaft is non-rotating and with said seal facing of said rotating sealing ring being disengaged from seal facing of said stationary sealing ring when said shaft is rotated.

14. In the tandem seal assembly according to claim 13, wherein said notches of said primary seal assembly are formed on said radial extending seal facing of said stationary sealing ring.

15. In the tandem seal assembly in accordance with claim 14, wherein said notches are a partial D-shaped configuration.

16. In the tandem seal assembly in accordance with claim 14, wherein said notches of said primary seal assembly are generally triangular shaped tapered notches.

17. In the tandem seal assembly in accordance with claim 13, wherein said notches of said primary seal assembly are formed on said radial extending seal facing of said rotating sealing ring.

18. In the tandem seal assembly in accordance with claim 17, wherein said notches are a partial D-shaped configuration.

19. In the tandem seal assembly in accordance with claim 17, wherein said notches of said primary seal assembly are generally triangular shaped tapered notches.

20. In the tandem seal assembly according to claim 13, wherein one of said seal facings of either of said rotating or said stationary sealing rings of said secondary seal assembly is comprised of a plurality of notches predetermindly spaced about and positioned on the radially extending seal facing of said respective sealing ring at an angle of approximately 45 degrees with respect to the perpendicular tangent of peripheral surface of said respective sealing ring.

* * * * *